US011403667B1

(12) United States Patent
Schwimmer

(10) Patent No.: US 11,403,667 B1
(45) Date of Patent: *Aug. 2, 2022

(54) PUBLISHER PAYWALL AND SUPPLEMENTAL CONTENT SERVER INTEGRATION

(71) Applicant: Google LLC, Mountain View, CA (US)

(72) Inventor: Michael Schwimmer, Hoboken, NJ (US)

(73) Assignee: Google LLC, Mountain View, CA (US)

(*) Notice: Subject to any disclaimer, the term of this patent is extended or adjusted under 35 U.S.C. 154(b) by 81 days.

This patent is subject to a terminal disclaimer.

(21) Appl. No.: 16/854,580

(22) Filed: Apr. 21, 2020

Related U.S. Application Data

(63) Continuation of application No. 16/039,925, filed on Jul. 19, 2018, now Pat. No. 10,664,864, which is a continuation of application No. 13/826,615, filed on Mar. 14, 2013, now Pat. No. 10,062,091.

(51) Int. Cl.
 *G06Q 30/02* (2012.01)
(52) U.S. Cl.
 CPC .................. *G06Q 30/0251* (2013.01)
(58) Field of Classification Search
 CPC .......... G06Q 30/0251; G06Q 30/0241
 See application file for complete search history.

(56) References Cited

U.S. PATENT DOCUMENTS

| 8,707,403 | B2 | 4/2014 | Malat et al. |
| 10,062,091 | B1 | 8/2018 | Schwimmer et al. |
| 10,664,864 | B1 | 5/2020 | Schwimmer |
| 2002/0040394 | A1 | 4/2002 | Shapira |
| 2002/0120564 | A1 | 8/2002 | Strietzel |
| 2005/0027587 | A1 | 2/2005 | Latona et al. |
| 2008/0097915 | A1 | 4/2008 | Golan et al. |
| 2008/0201326 | A1 | 8/2008 | Cotter et al. |
| 2009/0031431 | A1 | 1/2009 | Boccon-Gibod |
| 2009/0094039 | A1 | 4/2009 | MacDonald et al. |
| 2009/0187486 | A1* | 7/2009 | Lefenfeld .............. G06Q 30/02 707/999.107 |
| 2010/0036759 | A1 | 2/2010 | Ben-Yaacov et al. |
| 2010/0088170 | A1 | 4/2010 | Glore, Jr. |
| 2010/0216458 | A1* | 8/2010 | Cai ..................... H04L 65/1006 455/432.3 |

(Continued)

FOREIGN PATENT DOCUMENTS

KR  10-2005-0096092  10/2005

OTHER PUBLICATIONS

IP.com, "System and method to control website advertisement with a subscription system", Jul. 18, 2012, p. 1-5. (Year: 2012).*

(Continued)

*Primary Examiner* — Marie P Brady
(74) *Attorney, Agent, or Firm* — Fish & Richardson P.C.

(57) ABSTRACT

The present disclosure is directed generally to systems and methods for allowing a website publisher to integrate a website's paywall system with the website's supplemental content server system. The system and methods of the disclosure allow a publisher to offer subscriptions to customers that result in the display of fewer or no supplemental content items to paying customers while the supplemental content retrieving code remains in place for all website visitors. Additionally, the system allows website analytics to be calculated for all visitors to the website.

18 Claims, 4 Drawing Sheets

(56) References Cited

U.S. PATENT DOCUMENTS

| | | |
|---|---|---|
| 2010/0299205 A1* | 11/2010 | Erdmann ............... G06Q 30/02 |
| | | 705/14.54 |
| 2012/0089687 A1 | 4/2012 | Katz |
| 2012/0110619 A1 | 5/2012 | Kilar et al. |
| 2012/0260346 A1 | 10/2012 | Carey et al. |
| 2012/0290393 A1 | 11/2012 | Johansson et al. |
| 2012/0290922 A1* | 11/2012 | Fang ..................... G06F 16/958 |
| | | 715/234 |
| 2012/0303552 A1 | 11/2012 | Zayas et al. |
| 2013/0028573 A1 | 1/2013 | Hoofien et al. |
| 2013/0198013 A1 | 8/2013 | Shehan et al. |
| 2013/0212462 A1 | 8/2013 | Athas et al. |
| 2013/0275547 A1 | 10/2013 | Chew et al. |
| 2014/0250465 A1 | 9/2014 | Mulholland et al. |
| 2014/0257994 A1 | 9/2014 | Conant |
| 2014/0310779 A1 | 10/2014 | Lof et al. |

OTHER PUBLICATIONS

McLeod, "Magazine Monetizing Their Digital Presence: Three Strategies, Some Success", Simon Frazer University, Spring 2013, p. 1-52. (Year: 2013).*

Baker, "A National Paywall That Works," Columbia Journalism Review, Feb. 14, 2012, 7 pages.

Tanaka et al., "Chasing Sustainability on the Net," Comet, 2012, pp. 96-99.

* cited by examiner

PUBLISHER PAYWALL AND SUPPLEMENTAL CONTENT SERVER INTEGRATION

CROSS-REFERENCE TO RELATED APPLICATION

This application is a continuation application of U.S. application Ser. No. 16/039,925, filed Jul. 19, 2018, which is a continuation application of U.S. application Ser. No. 13/826,615, now U.S. Pat. No. 10,062,091, filed Mar. 14, 2013. The disclosure of each of the foregoing applications is incorporated herein by reference.

BACKGROUND OF THE DISCLOSURE

When a user subscribes to a website to gain access to a website's premium content, the website publisher may choose to show supplemental content to the user. The publisher may choose to leave the supplemental content in the website for the user because it is a technical challenge to remove the code for paying customers that retrieves the supplemental content from the supplemental content server. Additionally, it may not be feasible to remove the retrieval code because the code is often responsible for website analytics. Additionally, such a method requires a subscriber log into a website before the website can associate the user as a person for whom the supplemental content should be removed.

BRIEF SUMMARY OF THE DISCLOSURE

The present disclosure is directed generally to systems and methods for allowing a website publisher to integrate a website's paywall system with the website's supplemental content server system. The system and methods of the disclosure allow a publisher to offer subscriptions to customers that result in the display of fewer or no supplemental content items to paying customers. Additionally, the integration of the paywall and supplemental content server allows the supplemental content retrieving code to remain in place for all website visitors. When a user visits a webpage the supplemental content retrieval code requests a supplemental content item to display to the user. The integration allows the supplemental content server to recognize the visitor as a paying customer and therefore does not return a supplemental content item for display. Additionally, the system allows website analytics to be calculated for all visitors to the website. Furthermore, the system allows publishers to compare the revenue generated by the paying customers to revenue generated by customers who viewed supplemental content items. Because the supplemental content server can serve a plurality of websites, in some implementations, a user can log into the server to gain the benefits of the user's subscription rather than logging into to each website individually.

According to one aspect of the disclosure a system for providing content for display on a computing device includes one or more data processor, and one or more storage devices storing instructions that when executed by the one or more data processors, cause the one or more data processors to perform operations. The operations include receiving, from a first computing device, a payment associated with a first identifier and a first publisher identifier; storing, in a database, the first identifier in association with the first publisher identifier; and receiving, from a second computing device, a request for content to be displayed on a second computing device, wherein the request includes a second identifier and a second publisher identifier. The operations also include determining if the second identifier is stored in association with the second publisher identifier in the database; and transmitting, to the second computing device, a content item if the second identifier is determined to not be stored in association with the second publisher identifier.

In some implementations, the system is further configured to associate a third publisher identifier with the first publisher identifier and determine if the second identifier is stored in association with the third publisher identifier in the database. The system also transmits to the second computing device a content item if the second identifier is determined to not be stored in association with the third publisher identifier in some implementations.

In some implementations, when the system determines a computing device identifier is stored in association with a publisher identifier, the computing device identified by the computing device identifier is classified as a subscriber of the publisher associated with the publisher identifier.

In some implementations, the system is configured to store impressions, and the impressions can be analyzed and/or categorized as subscriber impressions or non-subscriber impressions. In certain implementations, the system is configured to calculate a portion of the payment that is owed to the first publisher identifier. In some implementations, the calculation of the portion is responsive to the analysis of the impressions.

In certain implementations, the system is configured to not transmit to the second computing device a content item if the second identifier is determined to be stored in association with the second publisher identifier, and in some implementations the content item is an advertisement.

According to another aspect of the disclosure, a method for providing content for display on a computing device, includes receiving, from a first computing device, a payment associated with a first identifier and a first publisher identifier; and storing, in a database, the first identifier in association with the first publisher identifier. The method also includes receiving, from a second computing device, a request for content to be displayed on a second computing device, wherein the request includes a second identifier and a second publisher identifier; determining if the second identifier is stored in association with the second publisher identifier in the database; and transmitting, to the second computing device, a content item if the second identifier is determined to not be stored in association with the second publisher identifier.

In some implementations, the method includes associating a third publisher identifier with the first publisher identifier and determining if the second identifier is stored in association with the third publisher identifier in the database. In some implementations, the method includes transmitting to the second computing device a content item if the second identifier is determined to not be stored in association with the third publisher identifier.

In certain implementations, the method includes determining if a client device is a subscriber of a publisher by determining if the identifier of the client device is stored in association with a publisher identifier.

In some implementations, the method includes storing an impression and analyzing the stored impressions. The impression is classified as a subscriber impression or a non-subscriber impression in some implementations. In certain implementations, the method further includes calculating a revenue share of the payment.

In some implementations, the method further includes not transmitting to the second computing device a content item if the second identifier is determined to be stored in association with the second publisher identifier.

According to another aspect of the disclosure, a computer readable medium having instructions stored thereon, which when executed by at least one processing circuit, cause the at least one processing circuit to provide content for display on a computing device. The computer readable medium includes instructions to receive, from a first computing device, a payment associated with a first identifier and a first publisher identifier; and to store, in a database, the first identifier in association with the first publisher identifier. The computer readable medium also includes instructions to receive, from a second computing device, a request for content to be displayed on a second computing device, wherein the request includes a second identifier and a second publisher identifier; and determine if the second identifier is stored in association with the second publisher identifier in the database. The computer readable medium further includes instructions to transmit, to the second computing device, a content item if the second identifier is determined to not be stored in association with the second publisher identifier.

In some implementations, the computer readable medium includes instructions that cause the at least one processing circuit to determine if the second identifier is stored in association with a third publisher identifier in the database. In some implementations, the instructions cause the at least one processing circuit to transmit to the second computing device a content item if the second identifier is determined to not be stored in association with the third publisher identifier.

In some implementations, the instructions cause the at least one processing circuit to calculate a portion of the payment due to a publisher associated with the first publisher identifier. In some implementations, the instructions cause the at least one processing circuit to determine if the second identifier is stored in association with the second publisher identifier identifies the second computing device as a subscriber to a publisher associated with the publisher identifier. In some implementations, the content item is an advertisement.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

While the disclosure has been particularly shown and described with reference to specific implementations, it should be understood by those skilled in the art that various changes in form and detail may be made therein without departing from the spirit and scope of the disclosure.

The present disclosure is directed generally to systems and methods for integrating a paywall system and a supplemental content server. The system and methods allow a publisher to offer subscriptions to customers that result in the display of less or no supplemental content to paying customers.

Figure 1:
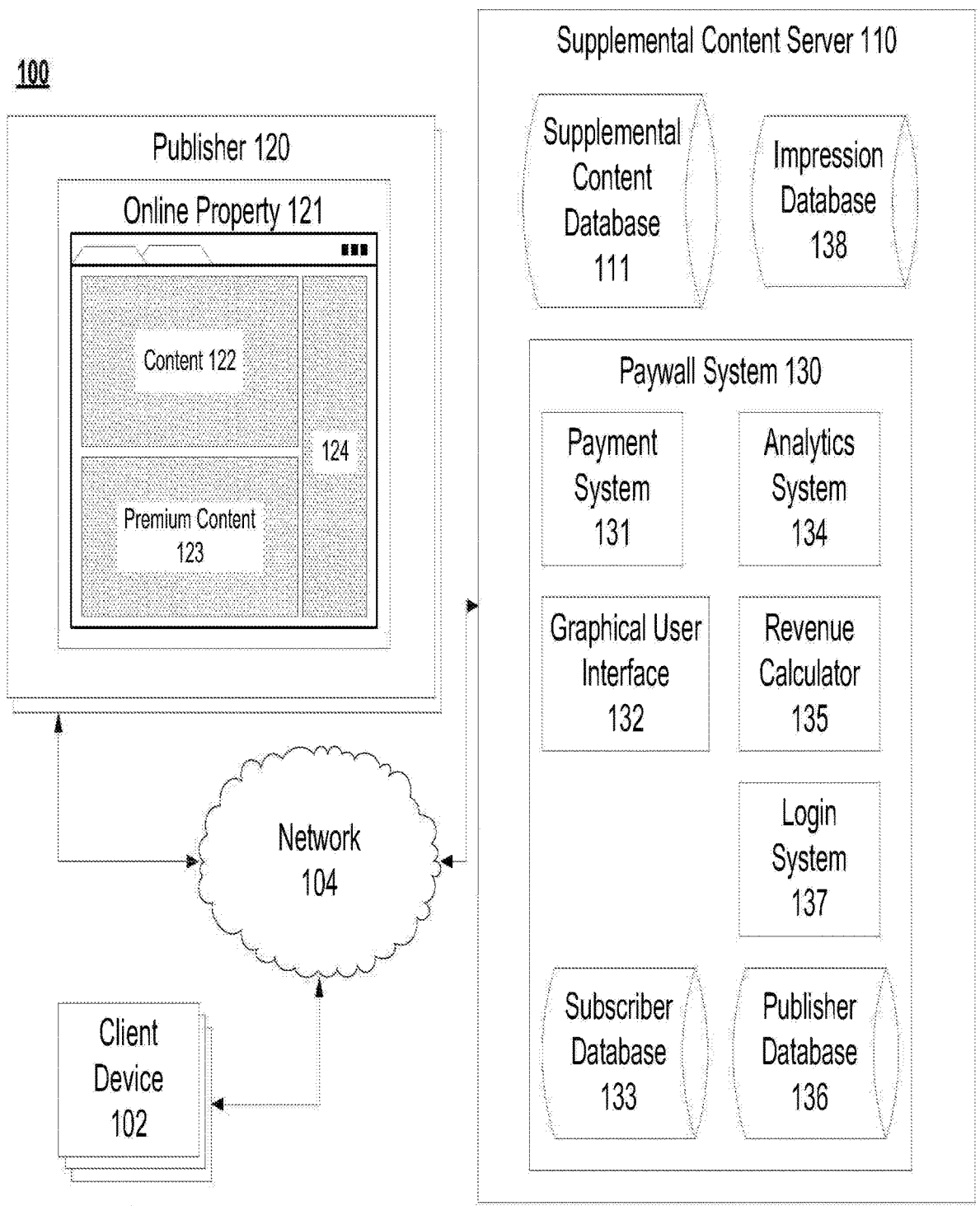
FIG. 1 is a block diagram of an example system for integrating a paywall system with a supplemental content server; in accordance with an implementation of the present disclosure.

FIG. 1 is a block diagram of a system 100 with an integrated paywall 130 and supplemental content server 110. The system 100 includes a plurality of publishers 120, which own or maintain at least one online property 121. Each online property 121 can provide content 122, premium content 123, and supplemental content 124 to at least one client device 102. The supplemental content server 110 supplies the supplemental content 124 to the online properties 121 and client devices 102 via the network 104. The supplemental content server 110 can also include a supplemental content database 111 and an impressions database 138. The paywall system 130 can manage the flow of supplemental content 124 to the plurality of online properties 121 and client devices 102 from the supplemental content server 110. The paywall system 130 includes a payment system 131, a graphical user interface 132, a subscriber database 133, an analytics system 134, a revenue calculator 135, a publisher database 136, and a login system 137.

As illustrated in FIG. 1, publisher owned online properties 121 can be viewed by users over the network 104 via a program running on a client device 102. The program, such a web browser, facilitates the sending and receiving of data between the client device 102 and online property 121. The online properties 121 can include, but are not limited to, websites, social media sites, business outlets or any other network accessible property. The client device 102 accesses content 122 on the online property 121. The content 122 can include blogs, articles, documents, digital media or any other network accessible content.

In addition to the content 122, the online properties 121 include space for the display of premium content 123, which, in some implementations, the client device 102 cannot access without paying a fee or purchasing a subscription. Example premium content can include streaming video of live events, news articles, or any other network accessible content. Additionally, the online properties 121 include space for the display of supplemental content 124. The supplemental content 124 can include, but is not limited to, supplemental information, links to related content, and advertisements. The distribution of the supplemental content 124 and premium content 123 to the client device 102 via the online property 121 can be managed by the paywall system 130. In some implementations, the paywall system 130 only manages the distribution of the supplemental content 124 to the online properties 121 and the publisher 120 provides the premium content 123. In some implementations, when a user purchases premium content 123 the paywall system 130 automatically removes supplemental content 124 from the online property 121 for user.

As discussed above, the supplemental content 124 may be provided to the online property 121 by the supplemental content server 110. In some implementations, the publisher 120 may allocate regions of an online property 121 to display the supplemental content 124. These allocated spaces may be filled with supplemental content 124 responsive to a client device 102 accessing the online property 121. The publisher 120 may insert code into the online property 121 that requests supplemental content 124 from the supplemental content server 110 via the paywall system 130 when a client device 102 accesses the online property 121. Upon receiving the supplemental content 124, the client device 102 may insert the supplemental content 124 into a rendered webpage of the online property 121 as instructed by the code placed in the online property 121 by the publisher 120.

As illustrated in FIG. 1, the paywall system 130 and supplemental content server 110 are within a single entity, such as a single ad server system. The paywall system 130 and the supplemental content server 110 need not be within a single entity. For example, the paywall system 130 can be an independent system that routes request from online properties 121 to a supplemental content server 110. Furthering this example, the paywall system 130 may provide the publisher with code that is inserted into the online properties 121 and handles the routing of supplemental content 124 from the supplemental content server 110 to the online properties 121 and client devices 102. Similarly, the supplemental content server 110 may communicate with the paywall system 130 via an API call. In some implementations, the publishers 120, supplemental content server 110, and paywall system 130 may operate within a single entity. For example, a large website may directly collect supplemental content 124 from third-parties, which the website directly places on the pages of its own website, and therefore the publisher 120, supplemental content 124 and paywall system 130 act within a single entity.

In some implementations, the paywall system 130 manages the transmission of the supplemental content 124 to client device 102 when the client device 102 accesses an online property 121. In some implementations, a publisher 120 may generate revenue from an online property 121 by displaying the supplemental content 124, such as an advertisement, to users who view the online property 121 via a client device 102. In such an implementation, revenue is generated when the supplemental content server 110 charges a fee to a third-party for distributing the third-party supplemental content 124 to publisher owned online properties 121. For example, a shoe company may pay a supplemental content server 110 $1.00 each time the supplemental content server 110 distributes an ad about the company's new tennis shoes to an online property 121 for display by a client device 102. In certain implementations, the supplemental content server 110 splits the revenue with the publisher 120 in response to the publisher 120 displaying the supplemental content 124 on the publisher owned online property 121. In some implementations, a user may subscribe to an online property 121 via the paywall system 130 to remove or reduce the supplemental content 124 that is displayed to the user.

The paywall system 130 may include a graphical user interface (GUI) 132 that facilitates the interaction of the paywall system 130 sub-components with the publisher 120 and/or users via the user's client device 102. Access to the GUI 132 may be secured using passwords, encryption, security keys or other security measures. The GUI 132 may be a webpage or the GUI of an mobile device or computer application.

A user can log into the paywall system's payment system 131 via the GUI 132 and subscribed to one or more online properties 121. Similarly, a publisher 120 can log into the payment system 221 via the GUI 132 to create and manage subscription plans, financial agreements, and publisher networks. As discussed below, in some implementations, publishers 120 may group their online properties 121 into networks or create networks with other publishers 120. In such implementations, a user can subscribe to one or more online properties 121 and/or one or more networks. In some implementations, the user can select between subscription durations and/or types of subscriptions. For example, the user may wish to gain access to a single premium content 123 item, such as a steaming video of a live boxing match, and accordingly can pay to access the single premium content 123. In another example, a user can purchase a subscription to an online property 121 to have all or some of the supplemental content 124 removed from a specific online property 121, and in some implementations, the user can purchase a subscription to premium content 123 that also removes some or all of the supplemental content 124 from an online property 121 when the user's client device 102 accesses the online property 121. In a similar example, supplemental content 124 may be included within non-premium video content. For example, a video streaming service may provide access to free TV shows that are interrupted every 15 minutes with a commercial. In some implementations, the purchase of the subscription removes some or all of the supplemental content 124 such that the video plays start to finish without interruption by a commercial.

The subscription can be automatically renewed or set to only be renewed when initiated by the user. In some implementations, the subscription may be tiered. Tiered subscriptions can include subscriptions that remove a specific percentage of the supplemental content 124 or that remove all of the supplemental content 124 for a specific number of visits to the online property 121. For example, a news website may offer a full subscription that allows access to all of the website's premium content 123 and removes all supplemental content 124 for $20.00 a month. Alternatively, the website may have a second tier subscription that removes all supplemental content and provides full access to the premium content 123 for 10 visits to the news website each month for $5.00.

The paywall system 130 also includes a publisher database 136. The paywall system 130 may store information pertaining to the publishers 120 in the publisher database 136. For example, the subscriptions and other fees set by publishers 120 can be stored in the publisher database 136. This can may be retrieved by the publisher 120 via the GUI 132 or by sub-components of the paywall system 130, such as the payment system 131, revenue calculator 135, and/or other components of the system 100. In some implementations, the paywall system 130 may also store publisher network relationships in the publisher database 136. As discussed above, in some examples, publishers 120 may create publisher networks that allow a user to gain access to all the online properties 121 within the publisher network. For example, a company that manages multiple blog websites may wish to allow a user who purchases a subscription to one of the blogs access the other blogs for free. In such an example, the owner of the blog network may register the websites within a publisher network. In certain implementations, the publisher network can include online properties 121 from separate publishers 120. For example, a publisher 120 that owns online properties 121 relating to furniture, a publisher 120 that owns online properties 121 relating to flooring, and a publisher 120 that owns online properties 121 relating to decorating may create a interior design publisher network. The paywall system 130 may store information relating to which networks and/or online properties 121 the client device 102 is subscribed to in the subscriber database 133.

As described above, when a client device 102 visits an online property 121, revenue is generated for the publishers 120 and supplemental content servers 110. The revenue calculator 135 can track the generation of revenue and calculate the proper distribution of the revenue to the parties involved. In some implementations, the distribution of the revenue generated by supplemental content 124, premium content 123 and subscriptions is equally divided between the parties involved. In some implementations, the revenue is divided according to a financial agreement decided on by the parties involved. For example, under one agreement, 10% of the revenue generated by the placement of supplemental content 124 into an online property 121 may go to the publisher 120, 90% of revenue generated by subscriptions may got to the publisher 120, and 100% of the revenue generated by the premium content 123 may go to the publisher 120.

In certain implementations, the revenue calculator 135 also calculates the revenue split between the members of a publisher network. For example, a user may pay $10 to remove the supplemental content 124 from a publisher network containing three websites. In some implementations, the websites may split the generated revenue equally, but in some implementations the websites may split the revenue based on the number of visits the subscriber made to each website within the publisher network, or according to another such financial agreement. Continuing with the example where revenue is split responsive to the distribution of website visits, if in one month a subscriber visited Website A six times, Website B three times, and Website C once, then, for the month in question, Website A may receive $6, website C $3, and website C $1. In certain implementations, the revenue calculator 135 uses information calculated by the analytics system 134 to determine revenue distribution.

As illustrated, the paywall system 130 includes an analytics system 134. As discussed in relation to the revenue calculator 135, data generated by the analytics system 134 can be used in the calculation of revenue shares. The analytics system 134 can also be used to analyze the site traffic an online property 121 experiences. In some implementations, the data can be used by a publisher 120 to manage decisions regarding the monetization of online properties 121. As an example, the publisher 120 may make decisions regarding the price point of a subscription. The analytics system 134 can, but is not limited to, measuring total traffic to an online property 121, total traffic to a publisher network, number of times a specific page of an online property 121 was accessed, and determining if the traffic was the result of a subscriber or a non-subscriber.

In certain implementations, the analytics system 134 can derive data from the above referenced measured data. Derived data can include, but is not limited to, determining net incremental gain/loss due to subscriptions and modeling appropriate subscription pricing based on historical traffic trends to an online property 121. For example, a publisher may receive $0.10 every time supplemental content 124 is viewed. In this example, when a subscriber views an online property 121 no supplemental content 124 is shown to the subscriber and therefore no supplemental content revenue is generated by a subscriber. However, the subscriber generates revenue for the online property 121 by purchasing a monthly $10.00 subscription. In this example, the analytics system 134 may provide a publisher 120 with an indication of the effectiveness of the current subscription price point by dividing the cost of the subscription by the average number of supplemental content 124 items a subscriber views. For example, the publisher 120 may determine that subscribers typically view one hundred and forty three supplemental content times over the course of the month, and therefore, using the price points from the above example, the analytics system 134 may suggest that the publisher 120 increase the price of the subscription, such that the subscription generates as much revenue for the publisher 120 as would be generated by the viewing of supplemental content 124.

Figure 2:
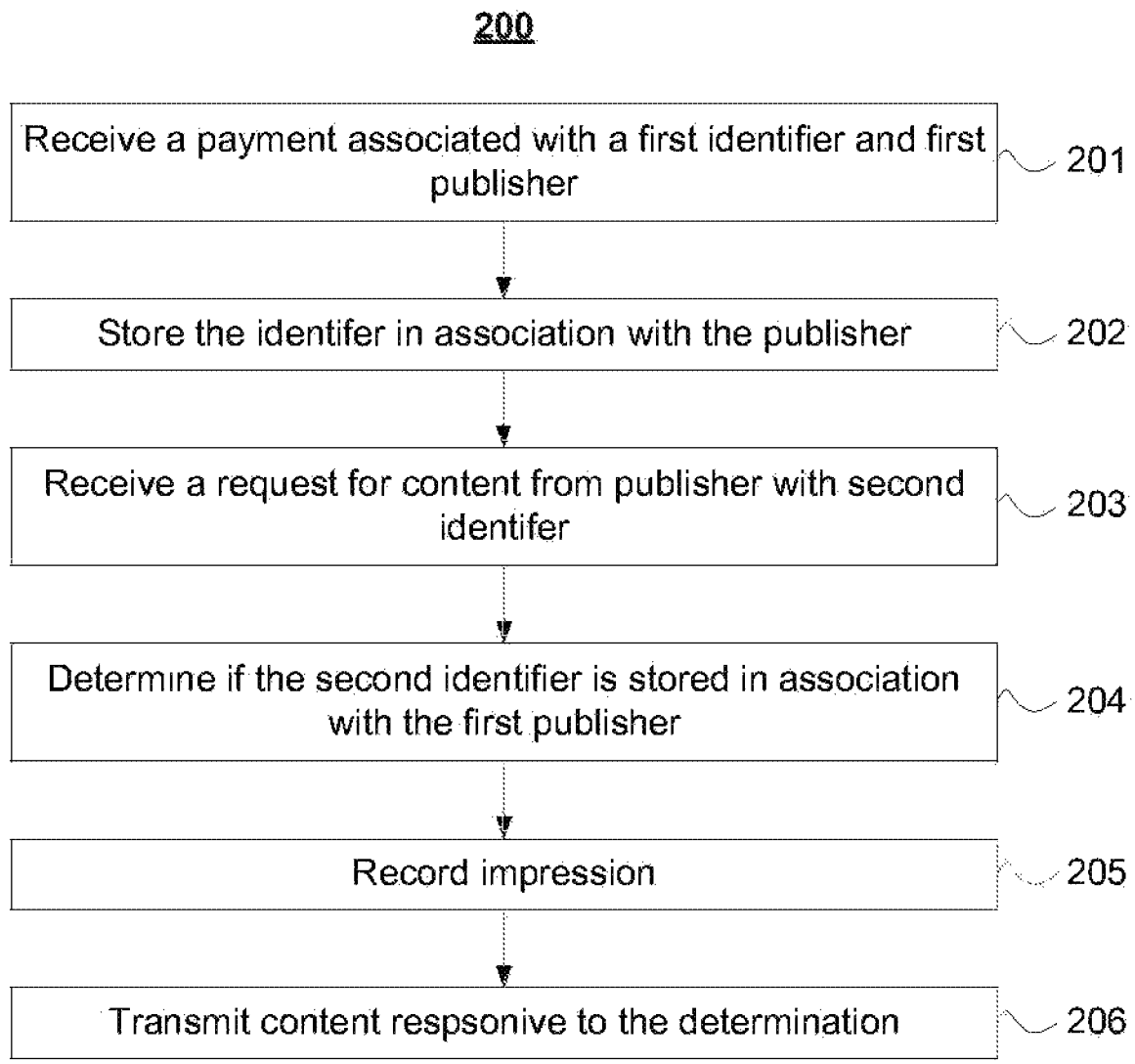
FIG. 2 is a flow diagram of an example method for providing supplemental content to a client device using the system of FIG. 1; in accordance with an implementation of the present disclosure.

FIG. 2 is a flow chart of a method 200 for delivering supplemental content 124 to a client device 102 with an integrated paywall system and supplemental content server. The method 200 begins with the receipt of a payment in association with a first client device identifier and a first publisher identifier (201). Next, the first client device identifier is stored in association with the first publisher identifier (202). When a client device 102 requests to view content 122 from an online property 121 a request for supplemental content is generated by the client device 102 and received by the paywall system 130 (203). Responsive to receiving the request, the paywall system 130 determines if the identifier of the client device generating the request was previously stored in association with the online property's publisher identifier (204). Responsive to the determination, an impression is recorded (205). Also responsive to the determination, a response is transmitted to the client device 102 (206).

As set forth above, at 201 the method 200 begins with the receipt of a payment to the paywall system 130. As described in relation to system 100, via the GUI 132 a user may log into the paywall system 130 and subscribe to one or more publisher networks and/or online properties 121. In some implementations, when logging in, an anonymous client device identifier is stored in a HTTP cookie on the client device 102. The HTTP cookie can be used by the paywall system 130 in later steps to determine if the client device 102 belongs to a subscriber.

At 202, the method 200 continues with the storing of the first client device in association with the first publisher identification. In some implementations, the client device identifier and publisher identifier are stored in the subscriber database 133. As described above, the user can purchase subscriptions to a plurality of online properties 121 and/or publisher networks. Therefore, in certain implementations, a client device identifier may be stored in the subscriber database in association with a plurality of publisher identifiers. In some implementations, steps 201 and 202 are repeated with a plurality of different client devices 102 and a plurality of different publishers and online properties 121.

At 203, a request is received by the paywall system 130 for supplemental content 124. In some implementations, the client device 102 requests the content from an online property 121 via the network 104 using the hypertext transfer protocol (HTTP) or similar protocol. The content 122 may be retrieved when a web browsers executes a webpage that contains client side executable code, that, when executed, requests the content 122, the premium content 123, and/or the supplemental content 124. For example, the paywall system 130 and/or supplemental content server 110 can provide the publisher 120 with code that requests supplemental content 124. The publisher 120 can insert the code into the webpage, such that when the client device 102 downloads and renders the webpage the client side code is automatically executed, triggering a request for supplemental content 124. The request for supplemental content 124 can be transmitted from the client device 102 to the paywall system 130 via the network 104.

In some implementations, the request for supplemental content 124 includes the client device identifier and a publisher identifier. In some implementations, the publisher identifier can identify a specific online property 121 or a network of online properties 121. In some implementations, the request includes the size and/or type of the supplemental content 124 to be delivered. For example, the code to retrieve the supplemental content 124 that is placed in the online property 121 may specify to the paywall system 130 that the request originated from a webpage of ACME, Corp. and that the returned supplemental content 124 should be a banner ad. In certain implementations, the client device identifier and other information transmitted with the request does not include any personal information relating to the user of the client device 102. In some implementations, the client device identifier can expire after a specific amount of time, when the user logs out of the client device 102, or when the user terminates the current online session.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

At 204, the method 200 continues by determining if the request is associated with a subscriber. The paywall system 130 can access the subscriber database 133 to search for the client device identifier of the requesting client device 102. In some implementations, the subscriber database 133 may be sorted by client device identifiers, publisher 120, publisher network, or online property 121. In some implementations, if the paywall system 130 determines the request is not from a subscriber, the paywall system 130 may ask if the user of client device 102 would like to become a subscriber. For example, the paywall system 130 may determine that a client device 102 has never accessed the online property 121 before and inform the user of the client device 102 that the online property 121 offers subscriptions to remove supplemental content 124.

In certain implementations, when the client device 102 logs into the paywall system 130 the paywall system 130 can automatically associate the client device identifier with a plurality of subscriptions. In some implementations, the automatic association of the client device identifier with the plurality of subscriptions, allows the client device 102 to automatically receive the benefits of the subscription at a plurality of online properties 121. For example, if a client device 102 subscribes to three publisher networks, each with 100 websites, by logging into the paywall system 130 once the client device 102 would receive the benefit of the subscription automatically at all three hundred websites. In some implementations, if the paywall system 130 is part of the online property 121, the user may be required to log into each of the websites within the network to receive the benefits of the subscription.

At 205 of method 200, an impression is stored. Responsive to the determining if the client device 102 is a subscriber or a non-subscriber the appropriate impression is stored in the impression database 138. For example, if the client device 102 is a subscriber a "paywall impression" is stored and if the client device 102 is a non-subscriber a "supplemental content impression" is stored. The analytics system 134 can use the impression data to determine revenue sharing and site analytics. In some implementations, the impressions can also store additional data, such as if the supplemental content was clicked on in a program executing on the client device 102.

At 206, a response is transmitted to the client device 102. In some implementations, if the request for supplemental content 124 was determined to originate from a non-subscriber the paywall system 130 may instruct the supplemental content server 110 to transfer supplemental content 124 to the client device 102 for display. If the request was determined to originate from a subscriber, the paywall system 130 may transmit to the client device 102 instructions to leave the space of the online property 121 reserved for supplemental content 124 blank. In some implementations, responsive to determining the client device 102 is a subscriber, the paywall system 130 may transmit at least one of the following to the client device 102: a transparent image the size of the requested supplemental content 124 such that when displayed it cannot be seen by a user, code that reconfigures the layout of the online property 121 such that the reserved space for the supplemental content 124 is removed from the online property 121, or the paywall system 130 may not transmit any response to the client device 102.

Figure 3:
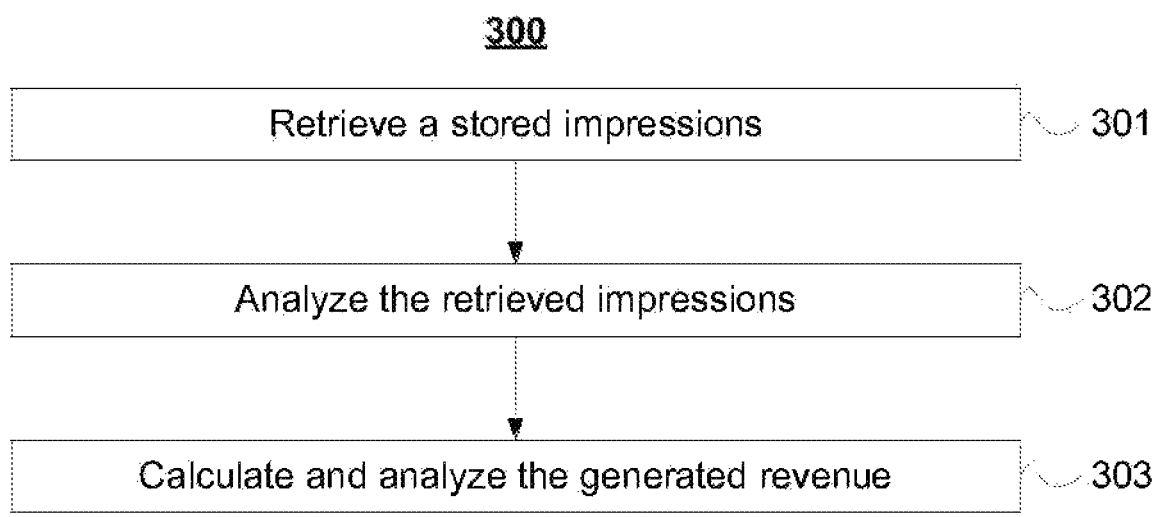
FIG. 3 is a flow diagram of an example method for calculating and analyzing revenue generated using the system of FIG. 1; in accordance with an implementation of the present disclosure.

FIG. 3 is a flow chart of an example method 300 for analyzing impressions and calculating revenue shares. The method includes retrieving a plurality of impressions (301). The plurality of impressions are analyzed (302), and revenue generated by the viewing of supplemental content and the purchase of subscriptions is calculated and analyzed (303).

At step 301, the method 300 of analyzing impressions and calculating revenue shares begins with the retrieval of a plurality of impressions. As described above, when an online property 121 is viewed, an impression can be stored in the impression database 138. In certain implementations, when stored, the impression can be tagged as the impression of a subscriber or the impression of a non-subscriber. During the retrieval step, the analytics system 134 may retrieve the plurality of impressions associated with a single online property 121, a plurality of online properties 121, or a publisher network.

At step 302, the method 300 continues with the analyzation of the plurality of impressions. The retrieval step 301 and the analyzation step 302 can be conducted hourly, daily, weekly, or monthly, or at any other time scale a publisher 120 or maintainer of the supplemental content server 110 determines beneficial. For example, the analytics system 134 may gather and analyze the impressions for a website once a day such that the publisher 120 can monitor viewing trends on the online property 121. In certain implementations, the analysis may be viewed in relation to subscriber impressions and/or non-subscriber impressions. The analysis of the plurality of impressions may allow a publisher 120 to determine which content on the online property 121 is viewed the most often, what search terms were used to find the online property 121 in an online search, what online properties 121 link to the online property 121 the publisher 120 is analyzing, and/or the total number of visits an online property 121 experienced over a specific amount of time. As discussed below, in certain implementations the analysis of the impressions is done in conjunction with the calculation of the revenue shares such that the revenue per impression may be analyzed.

At step 303, the method 300 continues with the calculation of revenue generated by the viewing of supplemental content 124 and the purchase of subscriptions. In some implementations, the calculation of the revenue includes analyzing the effectiveness of the supplemental content 124 and/or subscription model in generating revenue. A subscription's effectiveness may be quantified as the revenue generated by a subscription divided by the revenue generated if the user had not been a subscriber and revenue had been generated by the viewing of supplemental content 124 when accessing the online property 121. In such implementations, a number larger than one could indicate an effective subscription. In some implementations, the effectiveness of a subscription model may be determined by calculating an effective price per impression and comprising that to the actual price per impression the supplemental content server 110 is willing to pay to the publisher 120 for each viewing of supplemental content 124. Consider the example where $0.10 in revenue is generated for a publisher 120 each time a non-subscriber views supplemental content 124, a subscription to remove supplemental content 124 costs $10.00, and the above analysis determined that the average subscriber would view 100 items of supplemental content 124 if not a subscriber. In such an example, the online property's subscription price point may be considered ineffective because the actual price per impression is $0.10 and the effective price per impression is $0.05. In this example, a subscriber generates $10.00 in subscription revenue; however, the same subscriber would, on average, generate $20.00 in revenue if the subscriber had been a non-subscriber viewing supplemental content 124.

As discussed above, in some implementations, a subscription can be purchased for a publisher network. In some of these implementations, the revenue generated by a network subscription is divided evenly between the plurality of publishers 120 of the network. In some implementations, the paywall system 130 may divide the revenue generated by a subscription according to the number of times a subscriber visited each of the online properties 121 of the publisher network. For example, if a subscription is purchased for $20.00 and the purchaser visits Website A three times and Website B seven times, then, in this example, the publisher of Website A may receive $6 and the publisher of Website B may receive $14. In some implementations, a more complex financial agreement may be agreed upon by the publishers 120 of a publisher network. In such an example, the revenue generated may not be split equally or based solely on the number of visits to each online property 121. For example, a popular online property may create a publisher network and invite less popular online properties to become a member of the network. As part of the agreement the more popular online property may agree to link to the less popular online properties 121 in exchange for a portion of the revenue the less popular online properties generate when a user views supplemental content 124 on the less popular online properties.

Figure 4:
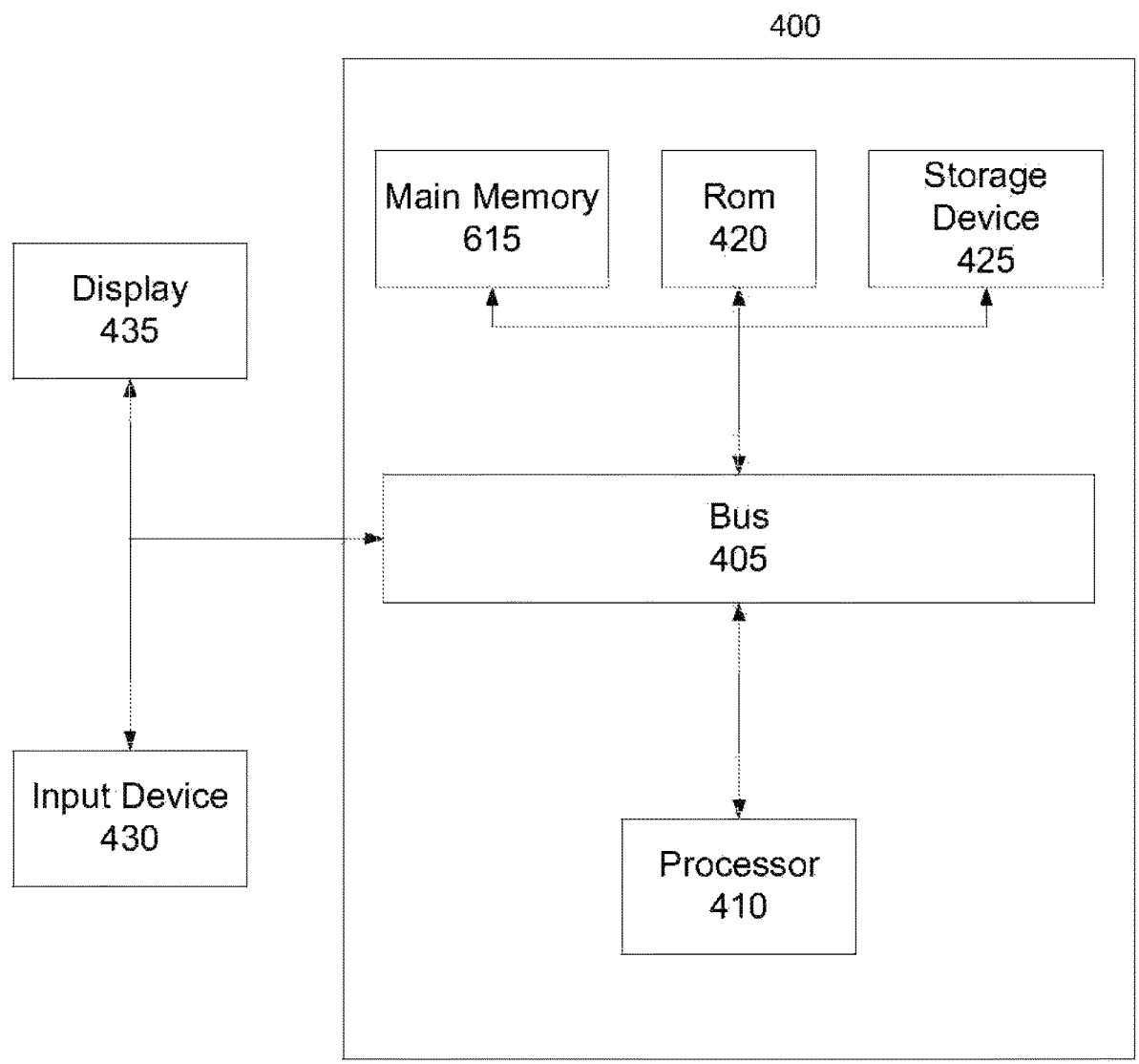
FIG. 4 is a block diagram illustrating a general architecture for a computer system that may be employed to implement various elements of the system shown in FIG. 1 and the methods shown in FIGS. 2 and 3; in accordance with an implementation of the present disclosure.

FIG. 4 is a block diagram of a computer system 400 in accordance with an illustrative implementation. The computer system or computing device 400 can be used to implement the system 100, supplemental content server 110, paywall system 130, client device 102, online property 221, and publisher 110. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hardwired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A system for providing content, comprising:
one or more data processors; and
one or more storage devices storing instructions that when executed by the one or more data processors, cause the one or more data processors to perform operations comprising:
identifying requests for content that are generated upon execution, by each of multiple different user devices, of a same supplemental content retrieving code that is included in code of a same given web page that is rendered by each of the multiple different user devices;
responding to the requests for content based on whether a user of each user device is a subscriber, including:
determining that first user of a first user device is a subscriber;
determining that a second user of a second user device is not a subscriber;
based on the determination that the first user is a subscriber:
preventing the same given web page from presenting a content item rather than sending the content item in response to execution of a particular supplemental content retrieving code that is part of the same given web page; and
based on the determination that the second user is not a subscriber:
allowing the same given web page to include a given content item in the same given web page in response to execution of the particular supplemental content retrieving code that is part of the same given web page.

2. The system of claim 1, wherein:
determining that the first user of the first user device is the subscriber comprises determining that a first identifier associated with the first user is included in a list of identifiers of subscribers; and
determining that the second user of the second user device is not the subscriber comprises determining that a second identifier associate with the second user is not included in the list of identifiers of subscribers.

3. The system of claim 2, wherein the instructions cause the one or more data processors to perform operations further comprising recording a paid impression for the first identifier.

4. The system of claim 2, wherein the instructions cause the one or more data processors to perform operations further comprising recording a content item impression for the second identifier.

5. The system of claim 1, wherein the instructions cause the one or more data processors to perform operations further comprising dividing revenue from the subscribers among plural, different publishers that provide content to the subscribers.

6. The system of claim 1, wherein the instructions cause the one or more data processors to perform operations further comprising dividing subscription revenue from the subscribers among plural different publishers that provide content to the subscribers based on a number of paid impressions attributed to each of the plural different publishers.

7. A method for providing content, comprising:
identifying, by one or more processors, requests for content that are generated upon execution, by each of multiple different user devices, of a same supplemental content retrieving code that is included in code of a same given web page that is rendered by each of the multiple different user devices;
responding, by the one or more processors, to the requests for content based on whether a user of each user device is a subscriber, including:
determining that first user of a first user device is a subscriber;
determining that a second user of a second user device is not a subscriber;
based on the determination that the first user is a subscriber:
preventing, by one or more processors, the same given web page from presenting a content item rather than sending the content item in response to execution of a particular supplemental content retrieving code that is part of the same given web page; and
based on the determination that the second user is not a subscriber:
allowing, by one or more processors, the same given web page to include a given content item in the same given web page in response to execution of the particular supplemental content retrieving code that is part of the same given web page.

8. The method of claim 7, wherein:
determining that the first user of the first user device is the subscriber comprises determining that a first identifier associated with the first user is included in a list of identifiers of subscribers; and
determining that the second user of the second user device is not the subscriber comprises determining that a second identifier associate with the second user is not included in the list of identifiers of subscribers.

9. The method of claim 8, further comprising recording a paid impression for the first identifier.

10. The method of claim 8, further comprising recording a content item impression for the second identifier.

11. The method of claim 7, further comprising dividing revenue from the subscribers among plural, different publishers that provide content to the subscribers.

12. The method of claim 7, further comprising dividing subscription revenue from the subscribers among plural different publishers that provide content to the subscribers based on a number of paid impressions attributed to each of the plural different publishers.

13. A non-transitory computer readable medium having instructions stored thereon, which when executed by one or more data processors, cause the one or more data processors to perform operations comprising:
identifying requests for content that are generated upon execution, by each of multiple different user devices, of a same supplemental content retrieving code that is included in code of a same given web page that is rendered by each of the multiple different user devices;
responding to the requests for content based on whether a user of each user device is a subscriber, including:
determining that first user of a first user device is a subscriber;

determining that a second user of a second user device is not a subscriber;

based on the determination that the first user is a subscriber:

preventing the same given web page from presenting a content item rather than sending the content item in response to execution of a particular supplemental content retrieving code that is part of the same given web page; and based on the determination that the second user is not a subscriber:

allowing the same given web page to include a given content item in the same given web page in response to execution of the particular supplemental content retrieving code that is part of the same given web page.

14. The non-transitory computer readable medium of claim 13, wherein:

determining that the first user of the first user device is the subscriber comprises determining that a first identifier associated with the first user is included in a list of identifiers of subscribers; and determining that the second user of the second user device is not the subscriber comprises determining that a second identifier associate with the second user is not included in the list of identifiers of subscribers.

15. The non-transitory computer readable medium of claim 14, wherein the instructions cause the one or more data processors to perform operations further comprising recording a paid impression for the first identifier.

16. The non-transitory computer readable medium of claim 14, wherein the instructions cause the one or more data processors to perform operations further comprising recording a content item impression for the second identifier.

17. The non-transitory computer readable medium of claim 13, wherein the instructions cause the one or more data processors to perform operations further comprising dividing revenue from the subscribers among plural, different publishers that provide content to the subscribers.

18. The non-transitory computer readable medium of claim 13, wherein the instructions cause the one or more data processors to perform operations further comprising dividing subscription revenue from the subscribers among plural different publishers that provide content to the subscribers based on a number of paid impressions attributed to each of the plural different publishers.

* * * * *